May 8, 1962 R. V. CRADDOCK 3,034,096
TAKE-OFF MONITORING APPARATUS FOR AIRCRAFT
Filed Oct. 1, 1956 3 Sheets-Sheet 1

$$\frac{V_i^2}{d_i} = \frac{V_r^2}{d_r}$$

$$\frac{V_i^2}{d_i} > \frac{V_r^2}{d_r}$$

$$\frac{V_i^2}{d_i} < \frac{V_r^2}{d_r}$$

INVENTOR
REGINALD V. CRADDOCK
BY
Hubert L. Boutcher
ATTORNEY

May 8, 1962 R. V. CRADDOCK 3,034,096
TAKE-OFF MONITORING APPARATUS FOR AIRCRAFT
Filed Oct. 1, 1956 3 Sheets-Sheet 2
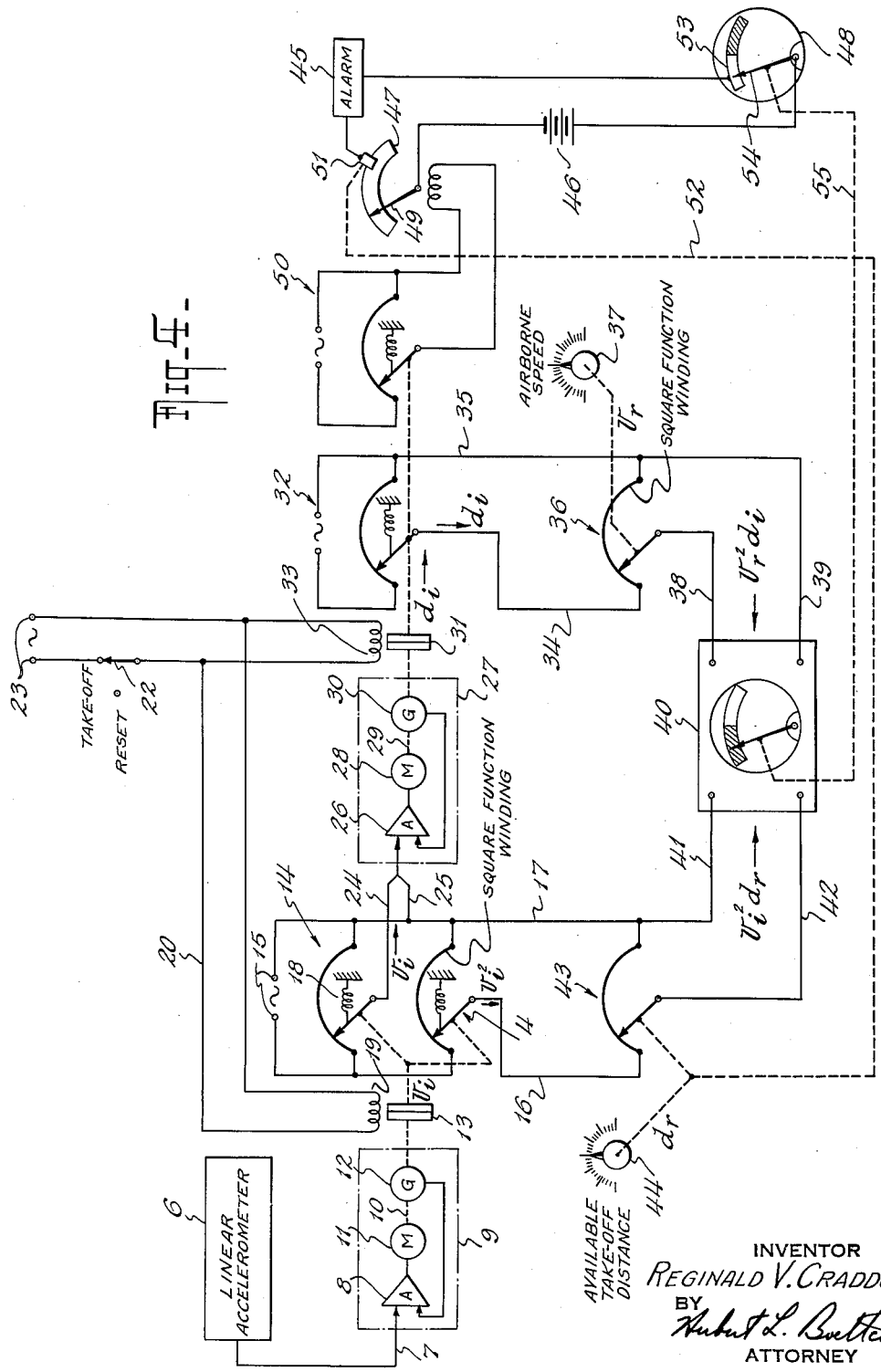
INVENTOR
REGINALD V. CRADDOCK
BY
Hubert L. Butcher
ATTORNEY May 8, 1962   R. V. CRADDOCK   3,034,096
TAKE-OFF MONITORING APPARATUS FOR AIRCRAFT
Filed Oct. 1, 1956   3 Sheets-Sheet 3
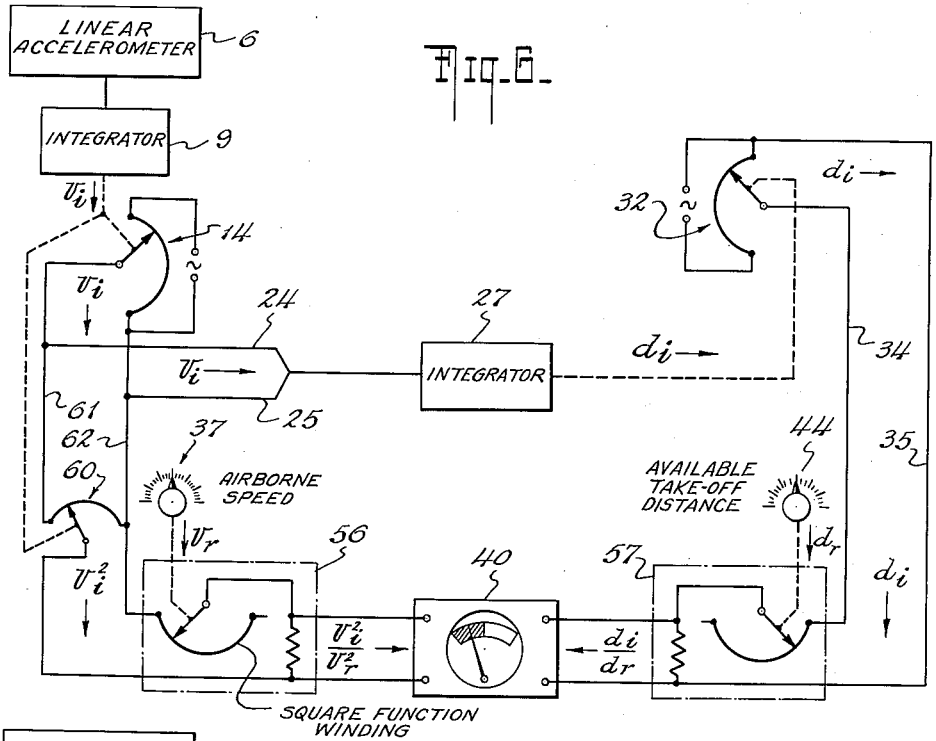
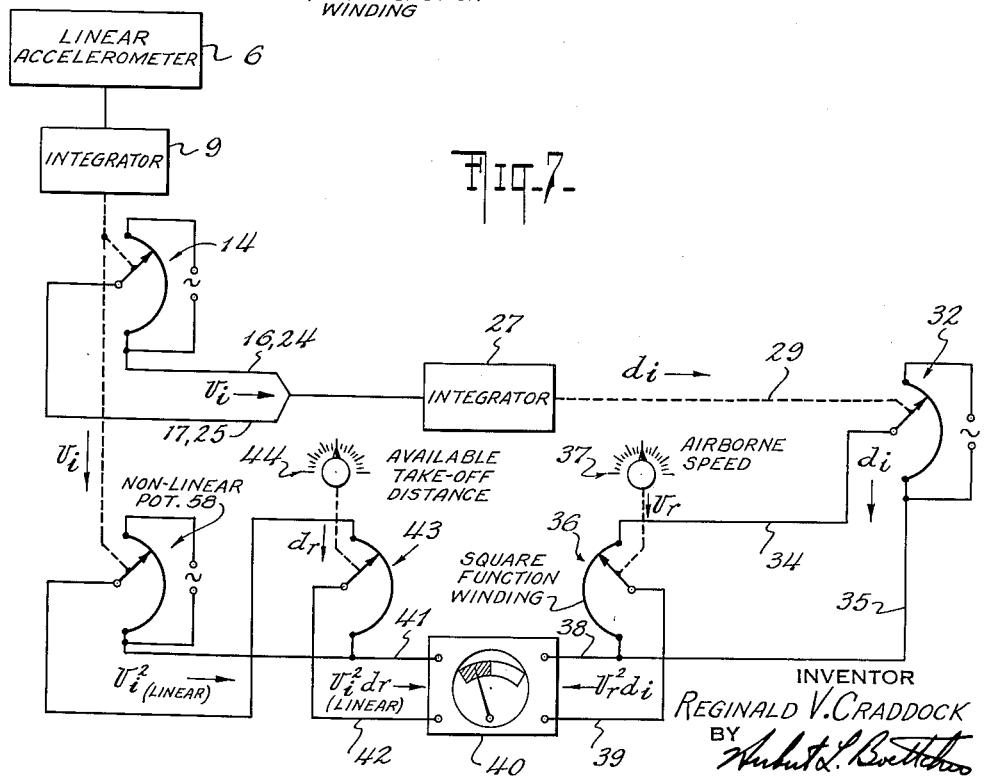
INVENTOR
REGINALD V. CRADDOCK
BY
ATTORNEY

United States Patent Office 3,034,096
Patented May 8, 1962

3,034,096
TAKE-OFF MONITORING APPARATUS
FOR AIRCRAFT
Reginald V. Craddock, New Hyde Park, N.Y., assignor to Sperry Rand Corporation, a corporation of Delaware
Filed Oct. 1, 1956, Ser. No. 613,104
16 Claims. (Cl. 340—27)

This application is a continuation-in-part of my copending application Serial No. 589,331, filed on June 4, 1956, now abandoned.

My invention relates generally to safety monitoring apparatus for aircraft. More particularly it concerns a novel apparatus for monitoring the take-off run of an aircraft in a manner to indicate, shortly after acceleration for the run commences and while the run may yet be stopped, whether or not the craft is foreordained to become airborne before its travel on the ground exceeds a preselected distance allotted for take-off.

If the lengths of runways at airports were interminable, little or no consideration would have to be given to limiting the take-off run of an aircraft to a preselected distance. Unfortunately, however, runway lengths of existing airports are becoming less and less adequate for many of the newer types of aircraft. And economic considerations and other sundry matters, like surrounding terrain, often rule out the provision of runways of great length in airports yet to be constructed.

Sufficient of the characteristics of an aircraft are generally known, however, for estimating fairly accurately before the craft's take-off run commences whether or not enough distance is available for a successful take-off. But miscalculations sometimes occur, and one or more of the factors upon which the estimate is based occasionally deviate from what is assumed. Examples of such factors are the thrust produced by the aircraft's power plant and the condition of the wind, barometric pressure and the like.

Hence, it becomes clear, particularly where the take-off distance predetermined to be required closely corresponds to the available take-off distance, that the safety of the craft is highly jeopardized by the real possibility of this predetermined take-off distance being in fact less than the actually required take-off distance. In many cases, a discrepancy between these distances is noticed by the pilot before his craft has accelerated down the runway to the point of no return, i.e., the point at which he can no longer brake the craft to a stop within the remaining length of runway. Yet there have been a notorious number of cases where the discrepancy has not been noticed in time, resulting in disasters, similar ones of which may now be avoided by use of the present invention.

By the present invention, an analog computation is made to predict what the speed of the aircraft will be when the craft on its take-off run has traveled the runway length available to it. The prediction is continuous from a time shortly after the take-off run commences; and concurrently, an uninterrupted comparison is made between the predicted speed and the speed known to be required of the craft to become airborne. A running indication of the results of the comparison is supplied to the pilot, so that long before the point of no return is reached, the pilot is advised of the prospects, good or bad, of a successful take-off within the prescribed distance.

Preferably, the prediction is based on data obtained by integrating with respect to time the measured acceleration of the craft. In this regard, the apparatus computes the first time integral of the craft's acceleration to obtain the craft's instantaneous speed and computes the second time integral to obtain the craft's instantaneous distance traveled. These instantaneous quantities are employed together with fixed corresponding quantities representing the airborne speed and the prescribed take-off distance to provide an indication of whether the relation of all the quantities is one which foretells success or failure.

Accordingly, it is a principal object of this invention to provide a novel apparatus for monitoring the take-off run of an aircraft.

Another object is the provision of monitoring apparatus for indicating shortly after the take-off run of an aircraft commences and relatively long before the point of no return is reached whether or not the craft is foreordained to become airborne before its travel on the ground exceeds a preselected distance allotted for take-off.

Another object is to provide a take-off monitoring apparatus responsive to values of craft speed and distance traversed, computed continuously from craft acceleration, for predicting whether the speed required of the craft to become airborne will be reached within a preselected distance allotted for take-off.

Another object is the provision of an alarm arrangement for the foregoing apparatus wherein an alarm is actuated after a given portion of the distance allotted for take-off is traversed if the craft is not then foreordained to become airborne within the allotted distance.

With the foregoing and other objects in view, the present invention includes the novel elements and the combination and arrangements thereof described below and illustrated in the accompanying drawings, in which:

FIG. 4 is a schematic diagram of an embodiment of the invention;

FIG. 6 is a schematic diagram of another embodiment of the present invention; and FIG. 7 is a schematic diagram of another modification of the embodiment of FIG. 4.

The term "parameter" as herein employed is intended, when pertaining to motion, the include the parameters: acceleration, velocity, distance and the like.

Figure 1:
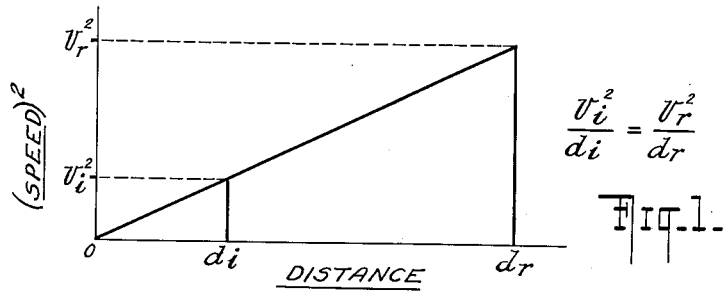
FIGS. 1–3 are graphical representations of speed vs. distance relationships indicated by the present invention.

Assuming a constant acceleration for the take-off run, the square of an aircraft's speed increases linearly from zero as the runway distance traversed increases from zero. A graphical representation of the speed-to-distance relationship required of such a craft to reach its airborne speed $v_r$ when a preselected distance $d_r$ is reached is shown in FIG. 1 by the hypotenuse of a right triangle having its base (abscissa) and altitude (ordinate) proportional to $d_r$ and $v_r^2$, respectively. This triangle serves as a reference against which the similarity is checked, in the present invention, of other right triangles correspondingly defined by instantaneous values of actual speed squared $v_i^2$ and actual distance $d_i$ traversed. One triangle so defined is superimposed on the reference triangle in FIG. 1, and in this case is similar to the latter so that the following relation exists:

(1) $$\frac{v_i^2}{d_i} = \frac{v_r^2}{d_r}$$

The existence of Relation 1 is predictive of the craft attaining its airborne speed at the preselected distance allotted to the craft for take-off.

Figure 2:
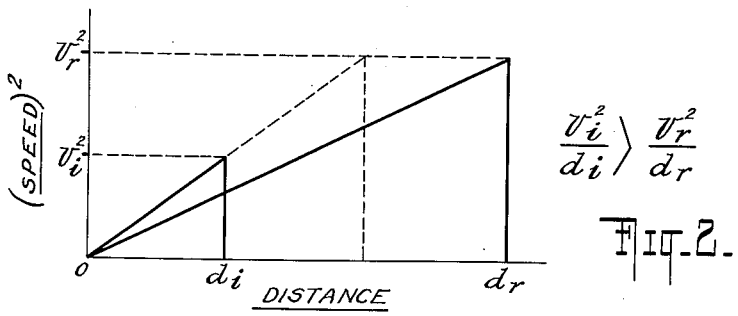

In FIG. 2, the instantaneously-defined triangle is depicted as dissimilar to the reference triangle in such a manner that (2) $$\frac{v_i^2}{d_i} > \frac{v_r^2}{d_r}$$

From Relation 2 therefore, it is apparent that the craft will reach its airborne speed before it has traversed the preselected take-off distance. Thus, if one or the other of Relations 1 and 2 exist during the take-off run, the pilot is thereby assured of a successful take-off.

Figure 3:
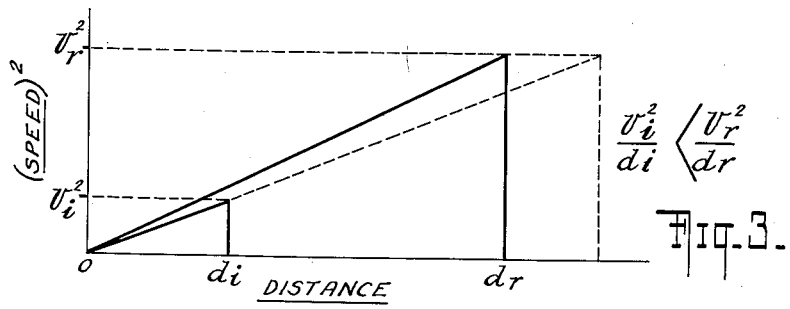

However, if the triangles are dissimilar in such a manner that (3) $$\frac{v_i^2}{d_i} < \frac{v_r^2}{d_r}$$

as shown in FIG. 3, it is clear that the craft is not fore-ordained to become airborne before it exceeds the preselected distance allotted for take-off.

The various embodiments of the present invention provide an apparatus in each case that indicates which of the Relations 1, 2, 3 exists during the take-off run of an aircraft employing the apparatus.

The embodiment shown in FIG. 4, for example, achieves this end by comparing the product $v_i^2 d_r$ with the product $v_r^2 d_i$ and displaying the results of the comparison on a suitable indicator. If $v_i^2 d_r \geqq v_r^2 d_i$, it is apparent that one of the satisfactory Relations 1, 2 exists. On the other hand, if $v_i^2 d_r < v_r^2 d_i$, the unsatisfactory Relation 3 exists.

In FIG. 4, a signal-generating linear accelerometer 6 is depicted which is installed in an aircraft so as to be sensitive to the forward acceleration of the craft and to supply an electrical signal output proportional to such acceleration. The acceleration signal is fed via a lead 7 to an amplifier 8 which forms part of an electro-mechanical integrator 9 for supplying a shaft displacement proportional to craft speed. This displacement is furnished by the movement of the output shaft 10 of a motor 11 connected to drive a tachometer-type generator 12 and energized by amplifier 8. The rate signal output of generator 12 is degeneratively fed back to amplifier 8 so that shaft 10 is driven at a rate proportional to the acceleration signal obtained from accelerometer 6. Thus, the craft's speed $v_i$ at any instant during take-off acceleration is represented proportionally by the angular displacement of shaft 10 from the shaft position occupied at the commencement of the acceleration.

Shaft 10 is drivably coupled through an electromagnetically controlled clutch 13 to the wiper arm of a potentiometer type signal generator 14 for transducing the shaft's mechanical signal proportional to $v_i$ to an electrical signal to like proportionality. The winding of generator 14 is energized from the terminals 15 of a source of alternating current, and the $v_i$ signal output of generator 14 is produced across a pair of leads (24, 25) respectively connected to the generator's wiper arm and one side of the generator's winding.

The wiper arm of generator 14 is mechanically connected to a spring 18 which is effective, when clutch 13 is disengaged, to move the arm to a zero output or reset position for generator 14. A control winding 19 for the clutch is connected via a pair of leads 20, 21 and a two-position switch 22 to the terminals 23 of a source of alternating current. Switch 22 is placed in its closed or take-off position by the pilot just prior to commencing his take-off run, thereby to energize control winding 19 and engage the clutch 13. Disengagement of the clutch to reset the generator 14 occurs when switch 22 is placed in its open or reset position.

Leads 24, 25 are connected to the input of an amplifier 26 which forms part of an electromechanical integrator 27 for supplying a shaft displacement proportional to the time integral of $v_i$, i.e. proportional to the distance $d_i$ traversed by the craft to attain the speed represented at any instant by the $v_i$ signal from generator 14. Integrator 27 may be identical to integrator 9, and in this regard includes a motor 28 energized by amplifier 26 and having an output shaft 29 connected to drive a tachometer-type generator 30 for rate feedback purposes.

Shaft 29 is drivably coupled through an electromagnetically controlled clutch 31 to the wiper arm of a potentiometer-type signal generator 32 for transducing the shaft's mechanical signal proportional to $d_i$ to an electrical signal of like proportionality. Generator 32 is like generator 14, and in this regard it, too, is energized from an alternating current source and has its wiper arm spring-biased to a zero output position. Clutch 31 is like clutch 13, and the control winding 33 therefor is connected in parallel with control winding 19, so that both of the generators 14, 32 are reset simultaneously when switch 22 is in its reset position, and both may be driven by their respective drive shafts when switch 22 is in its take-off position.

The $d_i$ output of generator 32 is connected by way of a pair of leads 34, 35 to the square function winding of a potentiometer-type analog multiplier 36 for multiplication by the square of the known airborne speed $v_r$ of the particular craft. A knob 37 cooperating with a speed-calibrated scale is linked to the wiper arm of multiplier 36 so that the pilot may selectively displace the arm from its zero output position in an amount proportion to $v_r$. By this arrangement, a signal proportional to the product $v_r^2 d_i$ is obtained on the output leads 38, 39 of multiplier 36.

Leads 38, 39 are connected to one set of input terminals of an indicator device 40 having another set of input terminals connected to the output leads 41, 42 of a potentiometer-type analog multiplier 43 having a linear function winding. The winding of multiplier 43 is energized according to the instantaneous craft speed squared, $v_i^2$, by way of a pair of leads 16, 17 forming the output leads of a potentiometer-type function generator 4. The wiper arm of generator 4 is mechanically coupled to the wiper arm of generator 14 and similarly spring-biased. Terminals 15 supply the winding of generator 4 with excitation, and the winding is function wound to produce an output on leads 16, 17 proportional to the square of the wiper arm displacement, i.e., the instantaneous craft speed squared $v_i^2$. A knob 44 cooperating with a distance-calibrated scale is linked to the wiper arm of multiplier 43 so that the pilot may selectively displace the arm from its zero output position in an amount proportional to $d_r$, the preselected available safe take-off distance. Thus, a signal proportional to the product $v_i^2 d_r$ is obtained on the output leads 41, 42 of multiplier 43.

Indicator device 40 is preferably a null-indicating voltmeter having a needle that points to a mid-scale zero or null index so long as the respective inputs to the meter are equal in magnitude. The inputs are so scaled that they are in fact equal in magnitude when the products they represent are equal in magnitude. Thus, indicator device 40 forms a means for comparing the product $v_i^2 d_r$ with the product $v_r^2 d_i$ and displaying the results of the comparison by the position of its needle. The side of the null index to which the needle points when $v_i^2 d_r < v_r^2 d_i$ may be colored red, for example, to indicate that the craft will not become airborne within the distance $d_r$.

Since $v_i$ is a ground speed quantity, the adjustment given to knob 37 is preferably according to $v_r$ in terms of ground speed. Thus, if the airborne speed is known to be 150 m.p.h. and a head wind component of 20 m.p.h. exists, the ground speed required of the craft to become airborne is 130 m.p.h., and knob 37 is preferably set accordingly. Yet, pursuing the example further, if the head wind component is ignored, the result is merely to introduce an added factor of safety. That is to say, a higher instantaneous speed $v_i$ at distance $d_i$ will be called for by the apparatus than is actually required for safe take-off.

Figure 5:
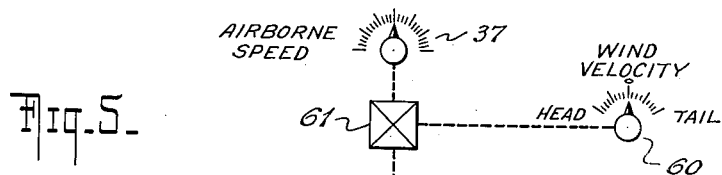
FIG. 5 is a schematic diagram of a modification of the embodiment of FIG. 4.

Alternatively, an arrangement may be provided as depicted in FIG. 5 in which the pilot adjusts the knob 37 to the known airborne airspeed and adjusts another knob 60 according to the head-wind velocity or tail-wind velocity, as the case might be. A mechanical differential 61 has one of its input sides irreversibly connected to knob 37 and the other of its input sides irreversibly connected to knob 60. The output side of differential 61 is connected to the wiper arm of analog multiplier 36. Knob 60 cooperates with a scale calibrated in terms of wind velocity, mid-scale setting of knob 60 being for zero wind velocity. For a head-wind, the adjustment is made on one side of the scale for subtracting the head-wind velocity from the airborne airspeed. By the same token, for a tail-wind, the adjustment is made on the other side of the scale for adding the tail-wind velocity to the airborne airspeed. By this arrangement, therefor, the wiper arm of multiplier 36 is readily positioned according to the airborne speed in terms of ground speed, the conversion from airborne speed in terms of airspeed being made mechanically through differential 61.

Useful indications of probable success or failure of the take-off run become available on indicator device 40 immediately after the commencement of the run. But if an indication of probable failure is noted early in the run, say when a quarter of the preselected distance $d_r$ has been traversed, the pilot may nevertheless desire to continue the run, hoping that success will be indicated before the point of no return is reached. To guard against the pilot waiting too long for an indication of success, an alarm arrangement may be conveniently provided in the present apparatus to operate if failure is indicated just before the point of no return is reached. One form of such an arrangement is shown for exemplary purposes in FIG. 4, and includes an electrically operated alarm device 45 connected in series with a battery 46 and a pair of switches 47, 48.

Alarm switch 47 is arranged to close just before the point of no return is reached, and in time for the pilot to safely stop the craft. In this regard, switch 47 may comprise a meter movement having a pointer 49 forming one contact of this switch and being positioned according to the instantaneous distance $d_i$ by the energization given the meter from a potentiometer-type signal generator 50 whose wiper arm is ganged with the wiper arm of the $d_i$ signal generator 32 and similarly spring-biased. The other contact of switch 47, namely a contact 51, may be adjusted positionally along the path of movement of pointer 49 by a connection 52 from knob 44. Connection 52 is such as to place contact 51 in a position where pointer 49 will meet contact 51 shortly before the point of no return is reached.

Alarm switch 48 is arranged to close only during such times that indicator device 40 indicates probable failure of the take-off run. In this regard, switch 48 comprises a fixed contact which may be a conducting segment 53 cooperating with a movable contact which may be a wiper arm 54. A connection 55 between the needle of indicator device 40 and wiper arm 54 causes wiper arm 54 to reside on segment 53, and thereby close the switch 48, only when failure is indicated. Thus, if switch 48 is closed when the craft has traveled a sufficient distance to also close the switch 47, the alarm circuit is completed and the pilot is given a final additional warning to act immediately to bring his craft to a stop.

The embodiment shown in FIG. 6, now to be described, indicates which of the Relations 1, 2, 3 exists during the take-off run by comparing the quotient $$\frac{v_i^2}{v_r^2}$$

with the quotient $$\frac{d_i}{d_r}$$

and displaying the results of the comparison on an indicator identical to indicator 40 of FIG. 4. If $$\frac{v_i^2}{v_r^2} \geq \frac{d_i}{d_r}$$

it is apparent that one of the satisfactory Relations 1, 2 exists. On the other hand, if $$\frac{v_i^2}{v_r^2} < \frac{d_i}{d_r}$$

the unsatisfactory Relation 3 exists.

In FIG. 6, many of the elements of FIG. 4 are duplicated. Hence, like numerical designations are applied where appropriate. Accordingly, in FIG. 6, the output of accelerometer 6 is again integrated with respect to time by integrator 9 to provide a mechanical signal in the form of a shaft displacement proportional to the instantaneous velocity $v_i$. The mechanical signal is again transduced by the potentiometer-type signal generator 14 to provide an electrical signal proportional to $v_i$ on leads 24, 25. However, the $v_i^2$ signal is now obtained from a potentiometer-type multiplier 60 having a wiper arm and linear winding which are respectively driven and energized according to the instantaneous craft speed $v_i$. In this regard, the winding of multiplier 60 is connected across the output of generator 14 via a pair of leads 61, 62; and the wiper arm of multiplier 60 is connected to the mechanical output of integrator 9. A potentiometer-type analog divider 56 having a wiper arm driven by $v_r$ knob 37 is connected to receive the $v_i^2$ signal output of multiplier 60. The winding of divider 56 is function wound so that the divider produces an output proportional to $$\frac{v_i^2}{v_r^2}$$

Further, in FIG. 6, the electrical signal proportional to $v_i$ on leads 24, 25 is again integrated by integrator 27 to provide a mechanical signal in the form of a shaft displacement proportional to the instantaneous distance $d_i$. This mechanical signal is again transduced by the potentiometer-type signal generator 32 to provide an electrical signal proportional to $d_i$ on leads 34, 35. However, the leads 34, 35 now furnish the $d_i$ signal as the dividend to a potentiometer-type analog divider 57, and the knob 44 now furnishes the $d_r$ signal as the divisor to divider 57, whereby the output of divider 57 is proportional to $$\frac{d_i}{d_r}$$

Indicator device 40 is then connected to receive the outputs of divider 56 and divider 57 for comparison purposes.

It will be apparent that comparisons other than those of the particular products described in connection with FIG. 4 and the particular quotients described in connection with FIG. 6 may be readily made with but slight modification of the circuits thus far described. For example, divider 57 of FIG. 6 may be employed to divide the $v_i^2$ output of multiplier 60 by the $d_i$ output of integrator 27, and a like divider may be employed to divide a $v_r^2$ signal (obtained from a function generator like generator 4 of FIG. 4) by the $d_r$ output of knob 44, whereby the quotient $$\frac{v_i^2}{d_i}$$

is compared with the quotient $$\frac{v_r^2}{d_r}$$

And, indications of failure or success may also be obtained if but one term is compared at the indicator device with a second term multiplied by a third term and divided by a fourth term, such as $v_i^2$ as compared to $$\frac{v_r^2 d_i}{d_r}$$

Thus far, the descriptions of the various embodiments of the present invention have assumed that the acceleration of the aircraft is substantially constant for the take-off run. The assumption is valid for many craft, particularly the jet type, for which this invention is especially well-suited due to the typically long take-off runs required of such craft. However, other craft, notably the piston type, may have a curvilinear acceleration vs. distance characteristic for take-off. FIG. 7 depicts the apparatus of FIG. 4 modified to monitor the take-off run of an aircraft having a curvilinear acceleration vs. distance characteristic.

In FIG. 7, the winding of analog multiplier 43 is energized from the output of a non-linear potentiometer signal generator 58 which is substituted for the generator 4 of FIG. 4. Non-linear generator 58 has its wiper arm driven by integrator 9, and is tailored for the craft in which it is installed so that its output increases linearly with distance, or, in other words, the square root of its output increases linearly with time, even though the integrator shaft does not rotate at a constant rate because of the changing acceleration signal from accelerometer 6. The remainder of FIG. 7 for supplying the $v_r^2 d_1$ term to indicator device 40 is identical to the corresponding portion of FIG. 4.

The omission in FIGS. 6 and 7 of the alarm arrangement and potentiometer resetting arrangement of FIG. 4 is done for the purpose of simplifying the description, it being obvious that these arrangements may readily be incorporated in FIGS. 6 and 7 in exactly the same manner as in FIG. 4.

While I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. Apparatus for monitoring the take-off run of an aircraft to determine whether the acceleration of said craft on said run will produce the airborne speed of said craft within a given runway distance, said apparatus comprising means for providing a signal continuously proportional to the speed of said craft as said speed approaches said airborne speed, means for providing a signal continuously proportional to the runway distance traversed by craft as said distance approaches said given runway distance, and means responsive to said signals for indicating deviations of the instantaneous ratios of the magnitude of said craft speed squared to the magnitude of said distance traversed from the ratio of the magnitude of said airborne speed squared to the magnitude of said given runway distance, a greater magnitude ratio of said craft speed squared to said distance traversed as compared to that of said airborne speed squared to said given runway distance being predictive of said craft attaining said airborne speed within said given runway distance.

2. Apparatus for monitoring the take-off run of an aircraft to determine whether the acceleration of said craft will produce the airborne speed of said craft within a given runway distance, said apparatus comprising first means for providing a pair of signals respectively proportional to craft speed and the distance traversed by said craft in attaining said speed during said take-off run, second means for providing a pair of signals respectively proportional to said airborne speed and said given runway distance, and signal-responsive means coupled to said first and second means for indicating the magnitude ratio of said craft speed squared to said distance traversed as compared to the magnitude ratio of said airborne speed squared to said given runway distance, a greater magnitude ratio of said craft speed squared to said distance traversed as compared to that of said airborne speed squared to said given runway distance being predictive of said craft attaining said airborne speed within said given runway distance.

3. Apparatus for monitoring the take-off run of an aircraft comprising a linear accelerometer for producing an output signal proportional to the instantaneous acceleration of the aircraft, means coupled to the output of the accelerometer for producing an output signal proportional to the instantaneous speed of the aircraft, means coupled to the output of said last-named means for producing an output signal proportional to the instantaneous distance traversed by the aircraft along the take-off runway, selectively adjustable means for producing an output signal proportional to the airborne velocity of the aircraft, selectively adjustable means for producing an output signal proportional to a preselected length of the take-off runway, and means responsive to the four output signals and including a null balance indicator for indicating equality between the instantaneous magnitude ratios of aircraft speed squared to distance traversed and airborne speed squared to said preselcted length of runway.

4. Apparatus for monitoring the take-off run of an aircraft comprising a linear accelerometer for producing an output signal proportional to the instantaneous acceleration of the aircraft, a first integrator coupled to the output of the accelerometer for producing an output signal proportional to the instantaneous speed of the aircraft, a second integrator coupled to the output of the first integrator for producing an output signal proportional to the instantaneous distance traversed by the aircraft along the take-off runway, selectively adjustable means for producing an output signal proportional to the airborne speed of the aircraft, selectively adjustable means for producing an output signal proportional to a preselected length of the take-off runway, and means responsive to the four output signals and including a null balance indicator for indicating equality between the instantaneous magnitude ratios of aircraft speed squared to distance traversed and airborne speed squared to said preselected length of runway.

5. Apparatus for monitoring the take-off run of an aircraft comprising a linear accelerometer for producing an output signal proportional to the instantaneous acceleration of the aircraft, a first electro-mechanical integrator coupled to the output of the accelerometer for producing an output signal proportional to the instantaneous speed of the aircraft, a second electro-mechanical integrator coupled to the output of the first integrator for producing an output signal proportional to the instantaneous distance traversed by the aircraft along the take-off runway, selectively adjustable means for producing an output signal proportional to the airborne speed of the aircraft, selectively adjustable means for producing an output signal proportional to a preselected length of the take-off runway, means responsive to the four output signals and including a null balance indicator for indicating equality between the instantaneous magnitude ratios of aircraft speed squared to distance traversed and airborne speed squared to said preselected length of runway, a first switch actuated in response to the second integrator output, means for selectively adjusting the first switch to close when the second integrator output reaches a predetermined value, a second switch actuated in response to said equality indicating means, means for closing the second switch when unbalance in one direction is indicated on the null balance indicator, and an alarm means connected to a power source through the first and second switches in series, whereby the alarm means is actuated when both switches are closed.

6. Apparatus for monitoring the take-off run of an aircraft comprising a linear accelerometer for producing a signal proportional to the instantaneous acceleration of the aircraft, a first integrator coupled to the output of the accelerometer for producing an output signal as a function of the instantaneous speed of the aircraft, a second integrator coupled to the output of the first integrator for producing an output signal proportional to the instantaneous distance traversed by the aircraft along the take-off runway, selectively adjustable means for producing an output signal as a function of the airborne speed of the aircraft, selectively adjustable means for producing an output signal proportional to a predetermined length of the take-off runway, and means responsive to the four output signals for indicating deviations of the craft's actual condition with respect to the required condition, said last mentioned means including alarm means actuated when the actual condition is less than the required condition.

7. Apparatus for monitoring the take-off run of an aircraft and for determining the relation of its actual performance to a reference standard comprising means including means responsive to the forward movement of said craft down the runway for providing a signal having a value at any instant proportional to a function of actual aircraft speed at that instant, and data-correlating means having an input and including means adapted to be adjusted in accordance with preselected values of known take-off data for establishing a reference standard representing a function of the required aircraft speed at any instant of time during its take-off run in order to achieve a safe take-off, said input being connected to receive said signal, and said data-correlating means including means responsive to the signal supplied to said input for supplying a signal dependent upon the relative values of the reference standard and the actual performance at any instant of time during the take-off run.

8. Apparatus for monitoring the take-off run of an aircraft and for determining the relation of its actual performance to a reference standard comprising means responsive to the forward acceleration of said craft down the runway for providing a measure proportional thereto, integrating means responsive to said measure for providing a signal proportional to the time integral of the acceleration, and data-correlating means having an input and including means adapted to be adjusted in accordance with preselected values of known take-off data for establishing a reference standard representing required actual values of aircraft forward progress down the runway at any instant of time during its take-off run in order to achieve a safe take-off, said input being connected to receive said signal, and said data-correlating means including means responsive to the signal supplied to said input for supplying output data representing the relative values of the reference standard and the actual performance at a particular instant of time during the take-off run.

9. Apparatus for monitoring the take-off run of an aircraft and for determining the relation of its actual performance to a reference standard comprising means responsive to the forward acceleration of the craft down the runway for providing a measure proportional to the instantaneous value thereof, integrating means responsive to said measure for providing first and second signals having values at any instant representative of a function of the actual velocity of the craft and distance traversed, respectively, at that instant during said run, means for providing first and second preselected values of known take-off data representative of a function of the air borne speed of the craft and a predetermined length of the take-off runway, respectively, for establishing a reference standard, and data-correlating means having first, second, third and fourth inputs and being operative to supply output data, said first and second inputs being adapted to receive said first and second preselected values respectively, said third and fourth inputs being adapted to receive said first and second signals respectively, and said output data representing the relative values of the reference standard and the actual performance at any instant of time during the take-off run.

10. Appartus for monitoring the take-ofl run of an aircraft to determine whether the acceleration of said craft will produce the airbone speed of said craft within a given runway distance, said apparatus comprising first means for providing a pair of signals respectively proportional to functions of the craft speed and the distance traversed by said craft in attaining said speed during said take-off run, second means for providing a pair of signals respectively proportional to functions of said airborne speed and said given runway distance, and data-correlating means connected to receive all of said signals, said data-correlating means being so constructed and arranged as to supply an output dependent upon the values of said signals and representing a comparison of the actual craft performance with a standard determined by the signals of said second means.

11. Apparatus for monitoring the take-off run of an aircraft to determine whether the acceleration of said craft on said run will produce the airborne speed of said craft within a given runway distance, said apparatus comprising means for supplying a first input corresponding to a required airborne speed for the craft, means for supplying a second input corresponding to a given runway distance, means responsive to forward movement of the aircraft for supplying a third input dependent upon actual craft forward movement down the runway, first computer means for generating a first signal corresponding to the speed versus distance relationship which the craft is required to experience throughout its take-off run in order to reach said airborne speed at said given distance down the runway, second computer means for generating a second signal corresponding to the speed versus distance relationship actually experience by said craft during its take-off run, and means coupled to receive said signals for indicating a difference between the craft's actual speed versus distance relationship and the standard represented by said first signal.

12. Apparatus for continuously monitoring the forward motion of an aircraft along a runway by employing measures of two different parameters pertaining to craft motion, said apparatus comprising means for supplying a first signal proportional to a function of one parameter of forward motion of an aircraft down a runway measured at a particular instant of time, means for supplying a second signal proportional to a function of a second and different parameter of said forward motion of the aircraft measured at said particular instant of time, means for supplying signals corresponding to the parameters measured by said first and second signals respectively but proportional in magnitude to prescribed required values thereof for the craft to become airborne after a given distance of take-off run, means for combining said signals in such a manner as to provide two resultant signals each representing a value in the same unit of measure whereby the resultant signals can be compared to determine the relationship of actual craft performance at any instant to that required for safe take-off conditions, and means responsive to said resultant signals for supplying an output dependent on the relationship of the magnitude thereof.

13. The apparatus of claim 12 in which the first signal is proportional to a function of the forward velocity of the aircraft.

14. The apparatus of claim 12 in which the first signal is proportional to the square of the forward velocity of the craft.

15. The apparatus of claim 12 in which the second signal is proportional to distance passed over by the craft at the particular instant of time.

16. The apparatus of claim 12 in which the first signal is proportional to a function of the forward velocity of the aircraft and the second signal is proportional to distance passed over by the craft at the particular instant of time.

References Cited in the file of this patent

UNITED STATES PATENTS

| | | |
|---|---|---|
| 2,408,711 | Valz | Oct. 1, 1946 |
| 2,447,336 | Hisserich | Aug. 17, 1948 |
| 2,500,545 | Herbst | Mar. 14, 1950 |
| 2,532,158 | Swing | Nov. 28, 1950 |
| 2,613,071 | Hansel | Oct. 7, 1952 |
| 2,701,111 | Schuck | Feb. 1, 1955 |
| 2,736,878 | Boyle | Feb. 28, 1956 |
| 2,740,108 | Plympton et al. | Mar. 27, 1956 |
| 2,797,912 | Trostler | July 2, 1957 |

FOREIGN PATENTS

| | | |
|---|---|---|
| 748,689 | Great Britain | May 9, 1956 |